(12) United States Patent
Chouery

(10) Patent No.: US 9,858,179 B2
(45) Date of Patent: Jan. 2, 2018

(54) DATA SORT USING MEMORY-INTENSIVE EXOSORT

(71) Applicant: Empire Technology Development LLC, Wilmington, DE (US)

(72) Inventor: Farid A. Chouery, Seattle, WA (US)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 157 days.

(21) Appl. No.: 14/430,891

(22) PCT Filed: Mar. 3, 2014

(86) PCT No.: PCT/US2014/019919
§ 371 (c)(1),
(2) Date: Mar. 24, 2015

(87) PCT Pub. No.: WO2015/133988
PCT Pub. Date: Sep. 11, 2015

(65) Prior Publication Data
US 2015/0324278 A1 Nov. 12, 2015

(51) Int. Cl.
*G06F 12/00* (2006.01)
*G06F 13/00* (2006.01)
(Continued)

(52) U.S. Cl.
CPC ............. *G06F 12/023* (2013.01); *G06F 7/22* (2013.01); *G06F 17/30* (2013.01); *G06F 7/06* (2013.01);
(Continued)

(58) Field of Classification Search
CPC . G06F 12/023; G06F 7/06; G06F 7/22; G06F 7/32; G06F 7/36
(Continued)

(56) References Cited

U.S. PATENT DOCUMENTS 6,859,455 B1    2/2005  Yazdani et al.
2002/0087500 A1*  7/2002  Berkowitz ........ G06F 17/30371
(Continued)

FOREIGN PATENT DOCUMENTS

EP        0378899 A2    7/1990

OTHER PUBLICATIONS

Goodrich, M. T., and Tamassia, R., "4.5 Bucket-Sort and Radix-Sort," Algorithm Design: Foundations, Analysis, and Internet Examples, John Wiley & Sons. pp. 241-243 (2002).
(Continued)

*Primary Examiner* — Charles Rones
*Assistant Examiner* — Sidney Li
(74) *Attorney, Agent, or Firm* — Turk IP Law, LLC

(57) ABSTRACT

Technologies are generally described to implement exosort in computing devices. In some examples, elements in a list to be sorted may be mapped to respective list positions based on some relationship. Collisions that occur at particular list positions may be resolved by allocating list space at those particular list positions based on the number of collisions and mapping collided elements to the respective allocated list space. Each allocated list space may then be further sorted, either by recursively using exosort or by using another sorting algorithm such as quicksort.

18 Claims, 7 Drawing Sheets

(51) Int. Cl.

| | |
|---|---|
| *G06F 13/28* | (2006.01) |
| *G06F 12/02* | (2006.01) |
| *G06F 17/30* | (2006.01) |
| *G06F 7/22* | (2006.01) |
| *G06F 7/32* | (2006.01) |
| *G06F 7/36* | (2006.01) |
| *G06F 7/06* | (2006.01) |

(52) U.S. Cl.
CPC .................. *G06F 7/32* (2013.01); *G06F 7/36* (2013.01); *G06F 2207/224* (2013.01); *G06F 2212/1008* (2013.01)

(58) Field of Classification Search
USPC .......................................... 711/165; 430/165
See application file for complete search history.

(56) References Cited

U.S. PATENT DOCUMENTS

| | | | |
|---|---|---|---|
| 2004/0177146 A1* | 9/2004 | Ishiyama | ................ H04L 29/06 709/226 |
| 2004/0210736 A1 | 10/2004 | Minnick et al. | |
| 2011/0252202 A1 | 10/2011 | Heine et al. | |
| 2011/0292830 A1 | 12/2011 | Yanggratoke et al. | |

OTHER PUBLICATIONS

Han, Y., "Deterministic sorting in O(nloglogn) time and linear space," Proceedings of the thirty-fourth annual ACM symposium on Theory of computing, Montreal, Quebec, Canada, 2002, p. 602-608.
Han, Y., and Thorup, M., "Integer Sorting in Expected Time and Linear Space," In Proceedings of the 43rd Symposium on Foundations of Computer Science FOCS. IEEE Computer Society, Washington, DC, pp. 135-144, (Nov. 16-19, 2002).
Huang, B., and Langston, M., "Fast Stable Merging and Sorting in Constant Extra Space," The Computer Journal, vol. 35, No. 6, pp. 643-650 (1992).
International Search Report and Written Opinion dated Jul. 18, 2014 in International Patent Application No. PCT/US14/19919.
Thorup, M., "Randomized Sorting in O(n log log n) Time and Linear Space Using Addition, Shift, and Bit-wise Boolean Operations," Journal of Algorithms, vol. 42, No. 2, pp. 205-230 (Feb. 2002).
"Comparison with Python's Samplesort Hybrid," Accessed at http://web.archive.org/web/20131115202210/http://svn.python.org/projects/python/trunk/Objects/listsort.txt, Accessed on Sep. 10, 2014, pp. 12
"Definition of: tag sort," Accessed at http://web.archive.org/web/20130621124202/http://www.pcmag.com/encyclopedia/term/52532/tag-sort, Accessed on Sep. 10, 2014, pp. 2.
"java.util: Class Arrays," Accessed at http://web.archive.org/web/20130921151151/http://docs.oracle.com/javase/1.3/docs/api/java/util/Arrays.html, Accessed on Sep. 10, 2014, pp. 22.
"jdk7/tl/jdk / changeset," Accessed at http://web.archive.org/web/20130616073620/http://hg.openjdkjava.net/jdk7/tl/jdk/rev/bfd7abda8f79, Accessed on Sep. 10, 2014, pp. 38.
"Selection Sort," Accessed at http://web.archive.org/web/20131121074748/http://www.algolist.net/Algorithms/Sorting/Selection_sort, Accessed on Sep. 10, 2014, pp. 1-2.
"stable_sort," accessed at http://web.archive.org/web/20131026162032/http://www.sgi.com/tech/stl/stable_sort.html, on Sep. 10, 2014, pp. 1-2.
"Wikipedia:Reference desk/Archives/Computing/2007 Feb. 6," accessed at http://en.wikipedia.org/wiki/Wikipedia:Reference_desk/Archives/Computing/2007_February_6, modified on Nov. 2, 2007, pp. 11.
Brejova, B., "Analyzing variants of Shellsort," Information Processing Letters, vol. 79, Issue 5, pp. 223-227, (Sep. 15, 2001).
Chouery, F. A, "Exosort for Strings," FAC Systems INC., p. 1 (2010).

\* cited by examiner

COMPUTER PROGRAM PRODUCT 700

SIGNAL-BEARING MEDIUM 702

704 AT LEAST ONE OF

ONE OR MORE INSTRUCTIONS TO IDENTIFY A LIST INCLUDING MULTIPLE ELEMENTS;

ONE OR MORE INSTRUCTIONS TO MAP AT LEAST ONE ELEMENT IN THE LIST TO A RESPECTIVE LIST POSITION BASED ON A LINEAR RELATIONSHIP;

ONE OR MORE INSTRUCTIONS TO DETERMINE A COLLISION PARAMETER AND ALLOCATING SPACE IN THE LIST BASED ON THE COLLISION PARAMETER FOR EACH MAPPED ELEMENT;

ONE OR MORE INSTRUCTIONS TO DETERMINE A RESPECTIVE LOCATION IN THE LIST BASED ON THE ALLOCATED SPACE AND COLLISION PARAMETER FOR EACH ELEMENT; AND

ONE OR MORE INSTRUCTIONS TO TRANSFER EACH ELEMENT TO ITS RESPECTIVE LOCATION IN THE LIST.

| COMPUTER-READABLE MEDIUM 706 | RECORDABLE MEDIUM 708 | COMMUNICATIONS MEDIUM 710 |
|---|---|---|

DATA SORT USING MEMORY-INTENSIVE EXOSORT

CROSS-REFERENCE TO RELATED APPLICATION

This Application is the U.S. National Stage filing under 35 U.S.C. §371 of International Application No. PCT/US14/19919, filed on Mar. 3, 2014. The International Application is hereby incorporated by reference in its entirety.

BACKGROUND

Unless otherwise indicated herein, the materials described in this section are not prior art to the claims in this application and are not admitted to be prior art by inclusion in this section.

The acquisition, processing, and analysis of "big data," or extremely large sets of data, have recently drawn much attention. As data acquisition speeds are becoming important to leaders in business, science, and technology fields, increasingly larger amounts of data may be collected and need to be processed. The processing of such large data sets often involves sorting the data elements within the data sets. Many sorting algorithms that are widely used in computing, such as the quicksort or partition-exchange algorithm, may involve a substantial amount of memory, memory management, and management of data collisions. Quicksort, one of the most commonly used data sorting algorithms, has been in use since 1960s.

The speed at which computers collate and organize information may no longer be limited to the amount of available random access memory (RAM) or processing power, however. Rather, the Quicksort algorithm may now be a major hindrance to improving data absorption rates, because it fails to fully utilize available memory at its disposal. If there is no additional memory available for sorting, then a comparison based sorting routine such as Quicksort may be close to optimal. However, for today and tomorrow's computers, the memory limitation may occur less frequently.

SUMMARY

The present disclosure generally describes techniques to implement exosort in a computing device.

According to some examples, methods are provided to generate a sorted list in memory. An example method may include identifying a list including multiple elements and stored at a first location in the memory, mapping at least one element to a respective list position, and determining a collision parameter for each mapped element. The example method may further include allocating, for each mapped element, space in the memory based on the collision parameter, determining a respective memory location in the memory based on the allocated space and the collision parameter for each element in the multiple elements, and transferring each element to its respective memory location.

According to other examples, a computing device is provided to generate a sorted list. The computing device may include a memory and a processing block. The processing block may be configured to identify a list including multiple elements and stored at a first location in the memory, map at least one element to a respective list position based on a linear relationship, and determining a collision parameter for each mapped element. The processing block may be further configured to allocate, for each mapped element, space in the memory based on the collision parameter, determine a respective memory location in the memory based on the allocated space and the collision parameter for each element in the multiple elements, and transfer each element to its respective memory location.

According to further examples, a processor is provided to execute an application module to generate a sorted list. The processor may include an on-chip memory and one or more cores coupled to the on-chip memory and configured to execute the application module. The application module may be configured to identify a list including multiple elements and stored at a first location in the memory, map at least one element to a respective list position based on a linear relationship computed based on a largest element in the list, a smallest element in the list, and/or a size of the list, and determining a collision parameter for each mapped element. The application module may be further configured to allocate, for each mapped element, space in the memory based on the collision parameter, determine a respective memory location in the memory based on the allocated space and the collision parameter for each element in the multiple elements, and transfer each element to its respective memory location.

According to yet further examples, a computer readable medium may store instructions for generating a sorted list in memory. The instructions may include identifying a list including multiple elements and stored at a first location in the memory, mapping at least one element to a respective list position, and determining a collision parameter for each mapped element. The instructions may further include allocating, for each mapped element, space in the memory based on the collision parameter, determining a respective memory location in the memory based on the allocated space and the collision parameter for each element in the multiple elements, and transferring each element to its respective memory location.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

FIG. 7 illustrates a block diagram of an example computer program product, all arranged in accordance with at least some embodiments described herein.

DETAILED DESCRIPTION

Figure 1:
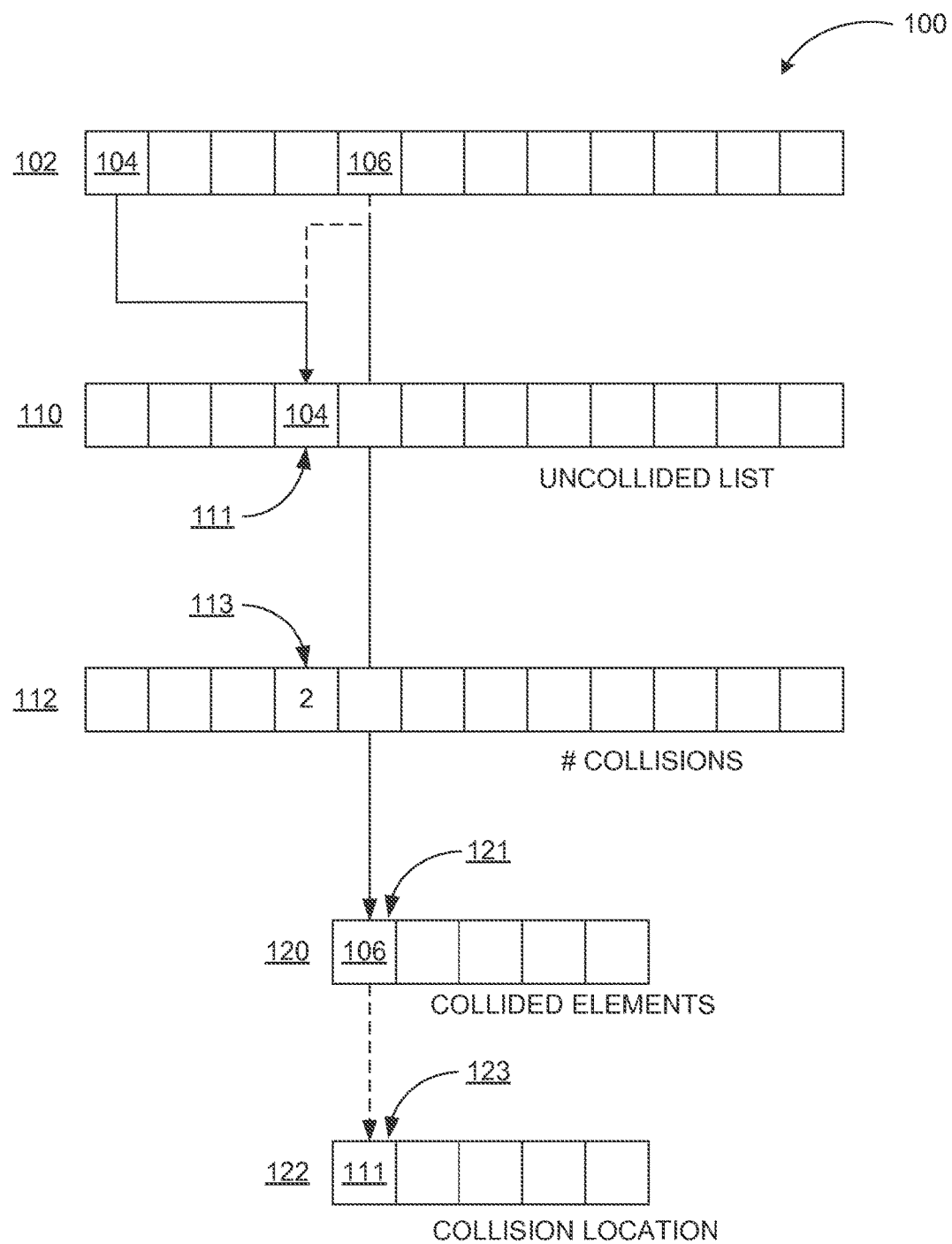
FIG. 1 illustrates a first stage in an exosort implementation, where data elements in a list may be mapped into a number of secondary lists.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. The aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatus, systems, devices, and/or computer program products related to implementation of exosort in a computing device.

Briefly stated, technologies are generally described to implement exosort in computing devices. In some examples, elements in a list to be sorted may be mapped to respective list positions based on some relationship. Collisions that occur at particular list positions may be resolved by allocating list space at those particular list positions based on the number of collisions and mapping collided elements to the respective allocated list space. Each allocated list space may then be further sorted, either by recursively using exosort or by using another sorting algorithm such as quicksort.

As described above, the processing of large data sets may involve sorting data elements within the data sets. Conventional sorting algorithms such as the quicksort algorithm may be configured to perform sorting while operating in a system-memory-limited regime. However, the system memory capacities of modern computing devices have grown significantly. As a result, these sorting algorithms may not be configured to take advantage of the additional system memory available in modern computing devices.

In some embodiments, a sorting algorithm may be implemented that uses additional available system memory to increase sorting speed. This sorting algorithm, referred to as an "exodus sort" or "exosort," may "exit" or map data elements to be sorted into different memory spaces. As a result, repetitive traversal of a list to be sorted may be reduced, thus increasing sorting speed.

FIG. 1 illustrates a first stage in an exosort implementation, where data elements in a list may be mapped into a number of secondary lists, arranged in accordance with at least some embodiments described herein.

According to a diagram 100, a list 102 to be sorted may include multiple data elements, such as an element 104 and an element 106. Upon beginning the exosort process, at least one element in the list 102 may be mapped to an uncollided list 110 based on a relationship or equation derived from the list 102. For example, the uncollided list 110 may be the same size as list 102, and each position in the uncollided list 110 may correspond to a potential value of an element in the list 102. In one embodiment, the mapping of positions in the uncollided list 110 to potential values of elements in the list 102 may be based on a linear relation or monotonic function equation. In this embodiment, the minimum and maximum element values in the list 102 may first be determined. The linear equation may then be derived from the determined minimum and maximum element values and the size of the list 102, where the equation may have the form $$y = mx + b.$$

In the above equation, a parameter x may represent particular positions in the uncollided list 110, and a parameter y may represent potential values of an element in the list 102 that correspond to those particular positions in the uncollided list 110. A parameter b may represent the determined minimum element value in the list 102. A parameter m may represent the "slope" for the linear equation, determined by dividing the difference between the maximum and minimum element values in the list 102 by the size or number of elements in the list 102. To map an element from the list 102 to the uncollided list 110, its value may be input as the parameter y in the equation above. The parameter x, indicating the location in uncollided list 110 the element should be mapped to, may then be solved for using the equation above. While a linear equation is described here, in other embodiments other equations or relationships may be used for the mapping. For example, if a distribution or statistic associated with the list 102 is known, a relationship that more closely approximates the distribution or statistic than a linear relationship may be used.

In the diagram 100, the element 104 may be mapped to a position 111 in the uncollided list 110 based on the linear equation above. In some embodiments, a number-of-collisions list 112 may first be checked to determine if any elements have already been mapped to the position 111. For example, a position 113 in the number-of-collisions list 112 may correspond to the position 111 in the uncollided list 110, and may store the number of elements that have been attempted to be mapped to the position 111. A value of "0" stored at the position 113 may indicate that no elements have been attempted to be mapped to the position 111, which may indicate that the position 111 does not contain any elements. On the other hand, a value of "1" or higher stored at the position 113 may indicate that at least one element has been attempted to be mapped to the position 111, indicating that the position 111 already contains an element and that subsequent mapping operations may result in a collision.

As described above, the element 104 may have been successfully mapped to the position 111 in the uncollided list 110, indicating that the position 113 in the number-of-collisions list 112 stored a "0" when the attempt to map the element 104 was made. As a result, the value in the position 113 may be incremented to "1", to indicate that one attempt to map an element to the position 111 was made. Subsequently, in the sorting process, another element 106 may be attempted to be mapped to the position 111 based on the linear equation above. However, the value of the position 113 in the number-of-collisions list 112 corresponding to the position 111 may now be "1", indicating that an element (in other words, the element 104) may have already been mapped to the position 111. As a result, a collision occurs, and the element 106 may instead be mapped to a position 121 in a collided elements list 120. In some embodiments, a collision location list 122 may also store the location or address of the collision (for example, the address for the position 111 in the uncollided list 110) in a position 123 corresponding to the position 121 in the collided elements list 120, which stores the collided element 106. The value of the position 113 in the number-of-collisions list 112 may be incremented to "2" to indicate that two elements have been attempted to be mapped to the position 111 (in other words, the element 104 which was successfully mapped and the element 106 which collided). Subsequently, this mapping process may continue until all of the elements in the list 102 have been processed and either mapped into the uncollided list 110 or the collided elements list 120.

Figure 2:
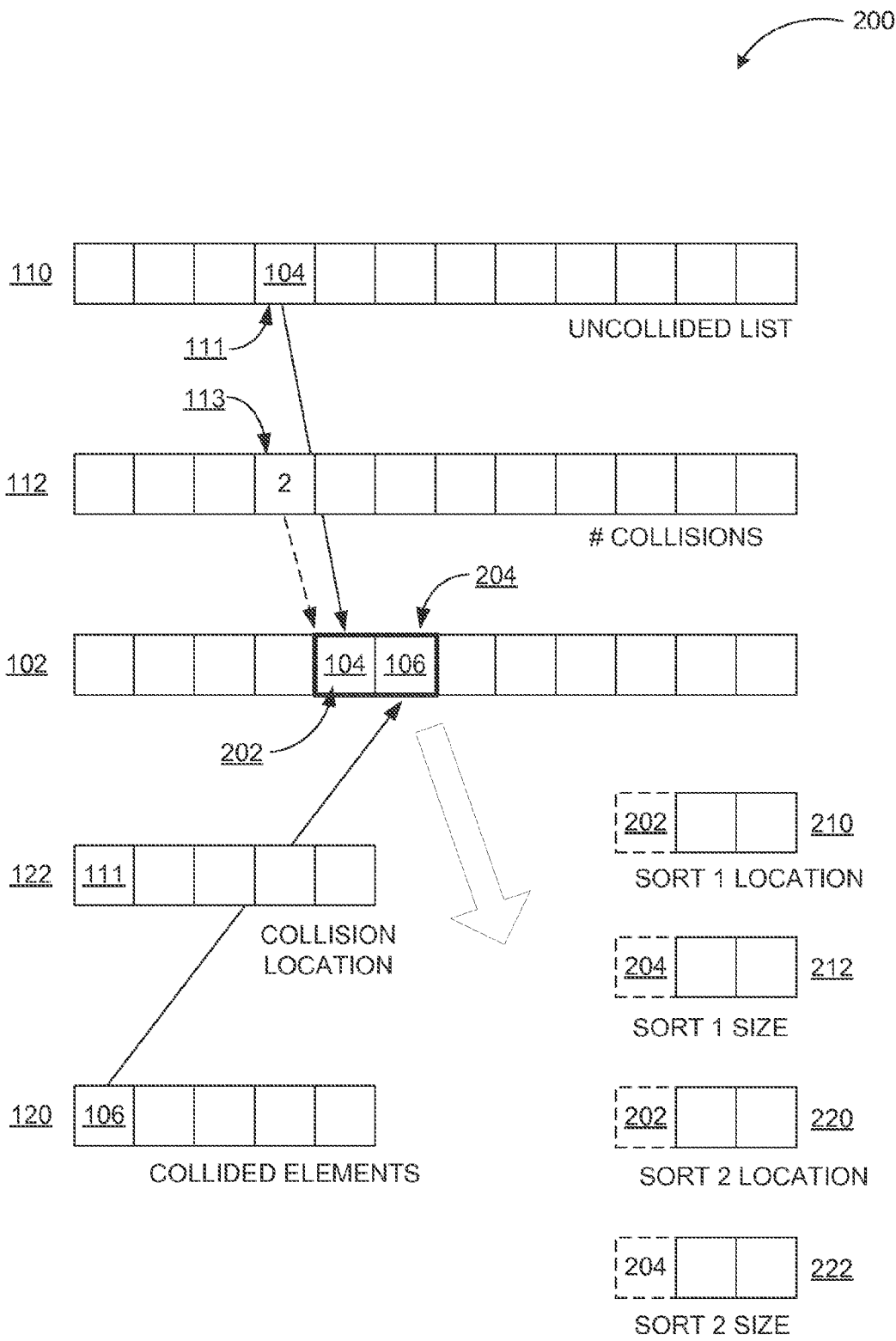
FIG. 2 illustrates a second stage in an exosort implementation, where data in the secondary lists may be returned to the original list.

FIG. 2 illustrates a second stage in an exosort implementation, where data in the secondary lists may be returned to the original list, arranged in accordance with at least some embodiments described herein.

As described above, a first stage in an exosort implementation may result in the elements in the list 102 being mapped into the uncollided list 110 and/or the collided elements list 120. As shown in a diagram 200, in a second stage of the exosort implementation elements in the uncollided list 110 and/or the collided elements list 120 may be returned to the list 102. In one embodiment, elements in the uncollided list 110 may be returned to the list 102 sequentially (in other words, from left to right in the uncollided list 110 as depicted). For example, the element 104 in the position 111 in the uncollided list 110 may be returned to a position 202 in the list 102. The position 202 may be determined based on the last element to be returned to the list 102, and may be determined so as to fill the list 102 sequentially (in other words, from left to right in the list 102 as depicted). Upon returning the element 104 to the position 202, the position 113 in the number-of-collisions list 112 may be checked to determine the number of collisions that occurred at the position 111 in the uncollided list 110. This may indicate an amount of space (or number of positions) in the list 102 that should be allocated for elements that collided at the position 111. For example, the position 113 has a value of "2". This may indicate that two elements were attempted to be mapped to the position 111 (the element 104 which was successfully mapped and the element 106 which collided), and therefore two positions starting at the position 202 in the list 102 should be allocated to make sure that all elements associated with the position 111 can be returned to the list 102. These two positions may form a subarray having an initial position 202 and a size 204. Subsequently, elements associated with the position 111 may be returned to the list 102 into the subarray having the initial position 202. For example, the element 104 may be returned to the first position (in other words, position 202) of the subarray in the list 102. Using the collided elements list 120 and the collision location list 122, other elements colliding at the position 111 may be determined and returned to the subarray in the list 102. For example, the element 106 stored in the collided elements list 120 and having a collision location of the position 111 (as noted in the collision location list 122) may be returned to the second position of the subarray in the list 102.

The elements returned to the list 102 in any particular subarray may not have been sorted yet, because the elements stored in the collided elements list 120 are not stored in a sorted order. As a result, each subarray's initial position and size may be stored for subsequent sorting. For example, the subarray containing the elements 104 and 106 may have its location (the position 202 of the list 102) and size (the size 204) stored for subsequent sorting.

In some embodiments, subarrays may be subsequently sorted using any suitable sorting algorithm. For example, subarrays may be sorted using the exosort process, a quicksort process, a heapsort process, or any other suitable sort. In some embodiments, the sorting algorithm used to sort a subarray may be selected based on some subarray characteristic, such as its location or its size, or some performance characteristic, such as available memory or desired sorting speed. For example, a subarray having a size larger than some predefined threshold may be sorted using a recursive exosort process, whereas a subarray having a size smaller than the predefined threshold may be sorted using another sorting algorithm such as the quicksort algorithm. In some embodiments, the predefined threshold may be selected to provide some sort of desired performance. For example, the predefined threshold may be selected such that subarrays sized smaller than the threshold are more quickly sorted with, for example, the quicksort algorithm, whereas subarrays sized larger than the threshold are more quickly sorted with the exosort algorithm. A subarray's location and size may be stored in lists corresponding to particular sorting algorithms. For example, if the subarray described above located at the position 202 and having the size 204 is to be sorted with a first sorting algorithm, its position 202 may be stored in a list 210 and its size 204 may be stored in a list 212, where the lists 210-212 are associated with the first sorting algorithm. Similarly, if the subarray is to be sorted with a second sorting algorithm, its position 202 and its size 204 may be stored in a list 220 and a list 222, respectively, where the lists 220-222 are associated with the second algorithm. In other embodiments, more or fewer sorting algorithms may be used to sort subarrays. For example, one of three different sorting algorithms may be selected for sorting a particular subarray, or only one sorting algorithm may be used to sort all subarrays.

Figure 3:
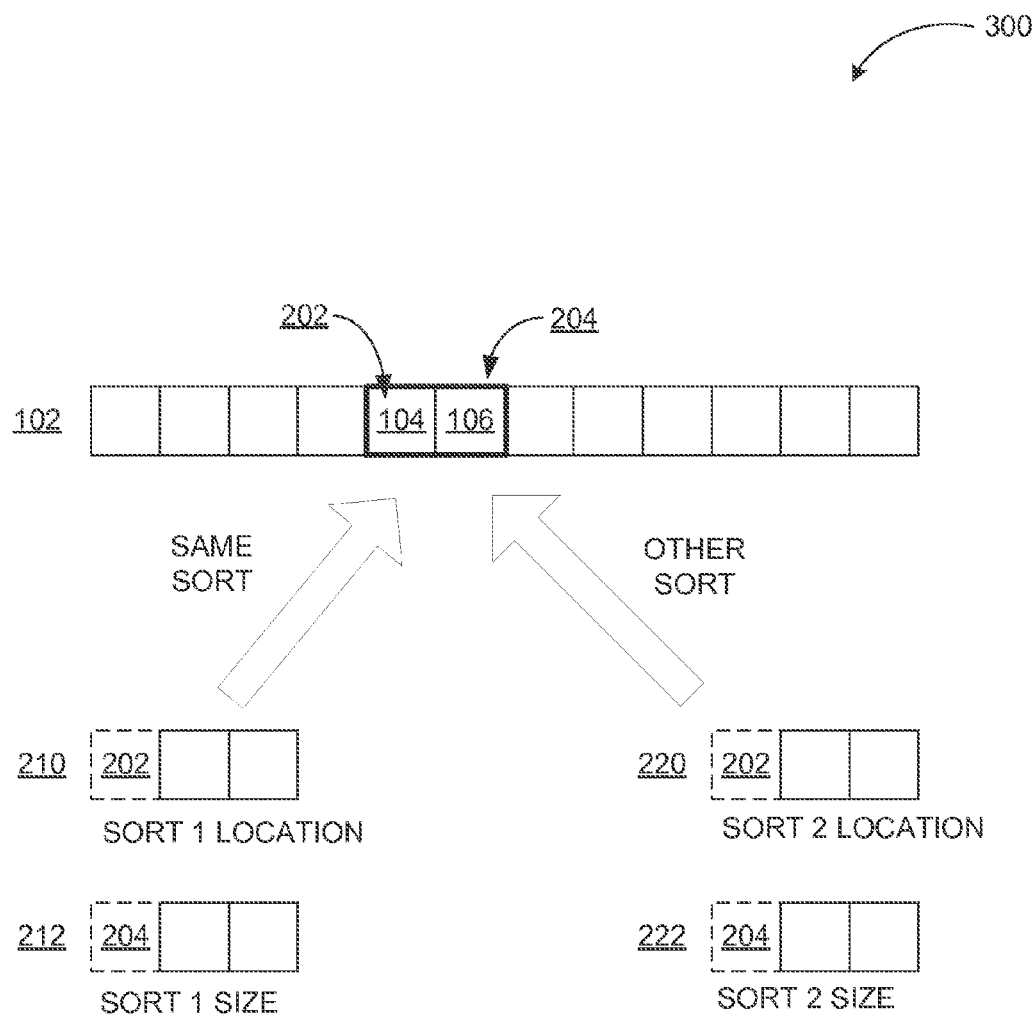
FIG. 3 illustrates a third stage in an exosort implementation, where subarrays in a list may be sorted.

FIG. 3 illustrates a third stage in an exosort implementation, where subarrays in a list may be sorted, arranged in accordance with at least some embodiments described herein.

As described above, the subarray located at the position 202 and having the size 204 may be subsequently sorted using a first sorting algorithm or a different sorting algorithm, based on the lists where its information is stored. For example, the same sorting algorithm (in other words, the exosort algorithm) may be used for the subarray if its position 202 and size 204 are stored in the lists 210 and 212.

As shown in a diagram 300, a different sorting algorithm (for example, the quicksort algorithm) may be used for the subarray if its position 202 and size 204 are stored in the lists 220 and 222. Regardless of the sorting algorithm used, a subarray sort may be performed by determining where the subarray begins in the list 102 (for example, the position 202) and processing elements in the list 102 starting at the subarray beginning position up to the size (for example, the size 204) of the subarray. For example, the subarray located at the position 202 may have a value of "2" for its size 204. A sorting algorithm may then process the element 104 (located at the position 202) and the element 106 (because the subarray has a size of "2"). In situations where subarrays are sorted using a recursive exosort process, each subarray may be treated as a new list to be sorted, similar to the list 102 in FIG. 1, and the exosort process described in FIGS. 1-3 may be repeated until sorting is complete.

As described above, the lists 210-212 and 220-222 may store information about subarrays to be further sorted. Each subarray indicated in the lists 210-212/220-222 may be sorted sequentially (in other words, one subarray after another), or multiple subarrays may be sorted in parallel. For example, two or more subarrays in the lists 210-212/220-222 may be sorted simultaneously if sufficient parallel processing capability and/or memory exist.

Figure 4:
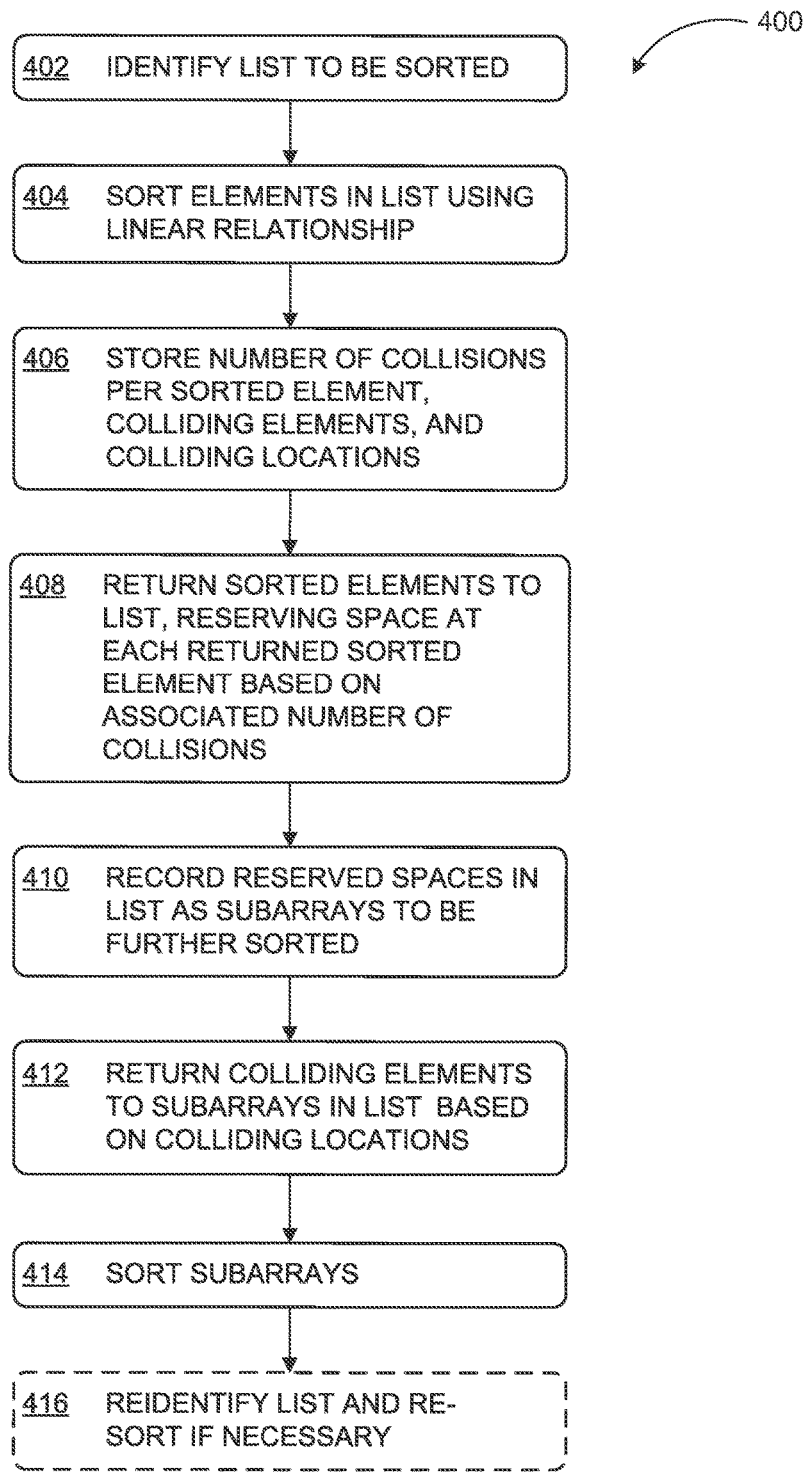
FIG. 4 depicts an example process for performing exosort on a list.

FIG. 4 depicts an example process 400 for performing exosort on a list, arranged in accordance with at least some embodiments described herein.

The process 400 may begin at an operation 402 "IDENTIFY LIST TO BE SORTED", where a list to be sorted (for example, the list 102) is identified. In embodiments where a subarray is to be sorted as described above in FIG. 3, the identification of the list to be sorted may be in the form of a subarray location and size.

At an operation 404 "SORT ELEMENTS IN LIST USING LINEAR RELATIONSHIP", elements in the identified list may be sorted using a linear relationship or equation as described above. In some embodiments, elements in the identified list may be sorted by being mapped to an uncollided list (e.g., the uncollided list 110) according to a linear relationship as described above.

At an operation 406 "STORE NUMBER OF COLLISIONS PER SORTED ELEMENT, COLLIDING ELEMENTS, AND COLLIDING LOCATIONS", each sorted element may cause a number of collisions. For example, a sorted element (for example, the element 104) that is mapped into an uncollided list may cause collisions when other elements (for example, the element 106) are attempted to be mapped into the same location (for example, the position 111), as described above. The number of collisions, colliding elements, and colliding locations may be stored in one or more other lists. For example, the number of collisions may be stored in the number-of-collisions list 112, the colliding elements may be stored in the collided elements list 120, and the colliding locations may be stored in the collision location list 122.

At an operation 408 "RETURN SORTED ELEMENTS TO LIST RESERVING SPACE AT EACH RETURNED SORTED ELEMENT BASED ON ASSOCIATED NUMBER OF COLLISIONS", the sorted elements may then be returned to the original list, as described above in FIG. 2. In some embodiments, each sorted element (for example, the element 104) may be returned to the original list with reserved space or positions in the original list based on the number of collisions associated with the respective sorted element, as described above. The number of collisions may be determined based on a list (for example, the number-of-collisions list 112). For example, if a particular sorted element to be returned to the list is associated with four collisions as recorded in a number-of-collisions list, four positions in the original list may be reserved for the respective sorted element and its associated colliding elements.

At an operation 410 "RECORD RESERVED SPACES IN LIST AS SUBARRAYS TO BE FURTHER SORTED", the space reserved in the original list for each returned sorted element may be recorded (for example, in the lists 210-212 or the lists 220-222) as subarrays to be further sorted, as described above, and colliding elements may then be returned to the original list in the reserved spaces corresponding to their colliding locations as described above in an operation 412 "RETURN COLLIDING ELEMENTS TO SUBARRAYS IN LIST BASED ON COLLIDING LOCATIONS".

At an operation 414 "SORT SUBARRAYS", the subarrays recorded in the operation 410 may then be sorted as described above in FIG. 3. In some embodiments, the subarrays may be sorted using a sorting algorithm determined based on one or more subarray characteristics, such as subarray size, or performance characteristics, such as available memory or desired sorting speed.

Finally, at an optional operation 416 "REIDENTIFY LIST AND RE-SORT IF NECESSARY", the list to be sorted may be reidentified and resorted if necessary. For example, if one or more of the subarrays to be sorted in the operation 414 are to be recursively sorted using the exosort process, the list to be sorted may be identified as one or more of those subarrays.

In the embodiments described above, an exosort process may involve the use of the uncollided list 110, the number-of-collisions list 112, the collided elements list 120, the collision location list 122, and the lists 210-212 and lists 220-222 associated with different sorting algorithms. However, in other embodiments, fewer lists may be used, which may result in reducing the amount of total memory used, while potentially reducing the speed of the exosort process. In one embodiment, instead of having both the uncollided list 110 and the number-of-collisions list 112, only the number-of-collisions list 112 may be used, with uncolliding elements being stored in the collided elements list 120. In another embodiment, either the lists 210-212 or the lists 220-222 may be eliminated. For example, suppose that the lists 210-212 store information about subarrays that are smaller than a predefined threshold and to be sorted using the quicksort algorithm. The lists 210-212 may then be eliminated by using the number-of-collisions list 112 to determine locations where the number of collisions is less than the predefined threshold and directly performing the quicksort algorithm at those locations rather than storing the information in the lists 210-212. In yet another embodiment, the collision location list 122 may be eliminated by recalculating collision locations using the linear equation described above.

Figure 5:
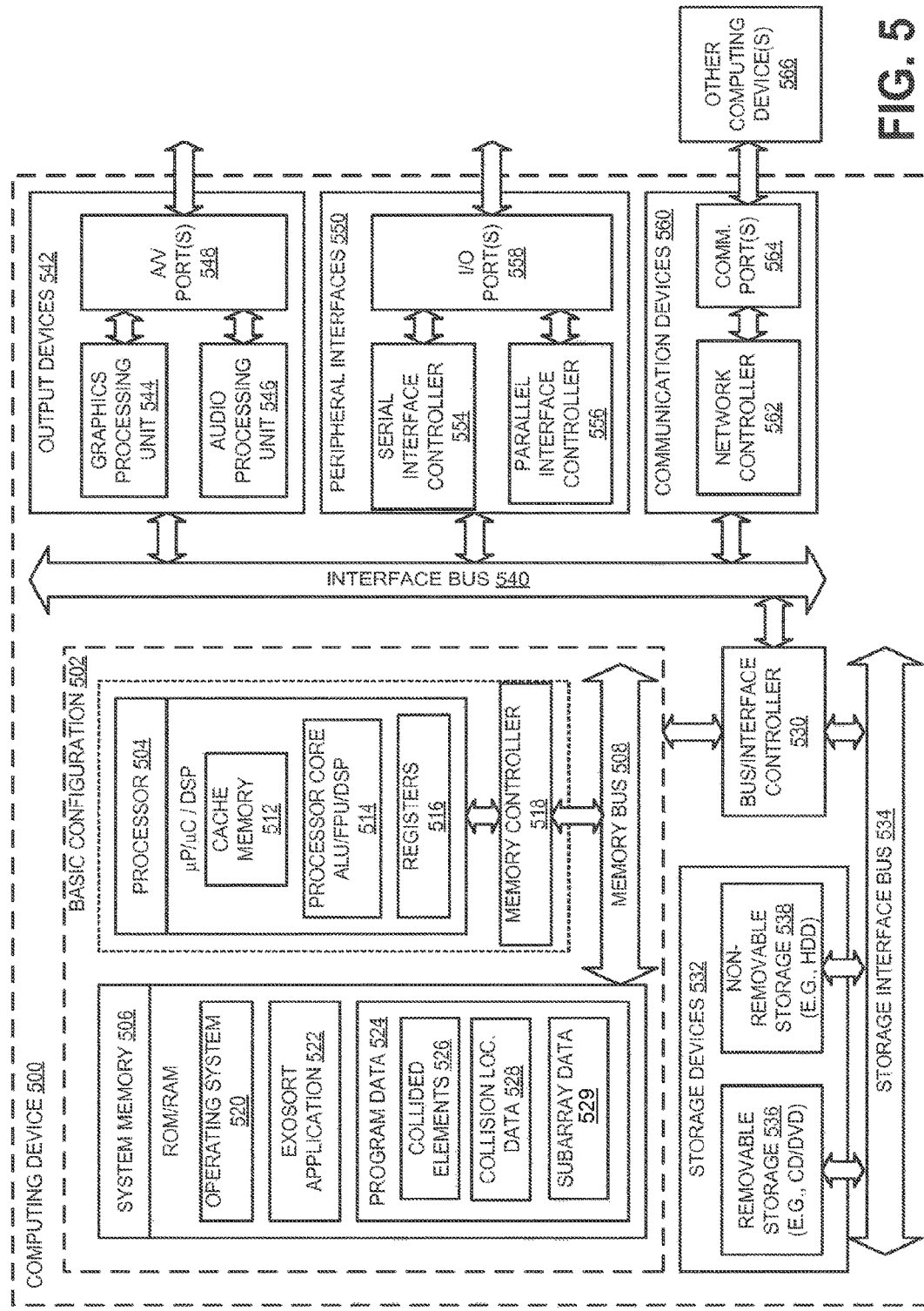
FIG. 5 illustrates a general purpose computing device, which may be used to implement exosort.

FIG. 5 illustrates a general purpose computing device, which may be used to implement exosort, arranged in accordance with at least some embodiments described herein.

For example, the computing device 500 may be used to implement exosort as described herein. In an example basic configuration 502, the computing device 500 may include one or more processors 504 and a system memory 506. A memory bus 508 may be used to communicate between the processor 504 and the system memory 506. The basic configuration 502 is illustrated in FIG. 5 by those components within the inner dashed line.

Depending on the desired configuration, the processor 504 may be of any type, including but not limited to a microprocessor ($\mu$P), a microcontroller ($\mu$C), a digital signal processor (DSP), or any combination thereof. The processor 504 may include one or more levels of caching, such as a cache memory 512, a processor core 514, and registers 516. The example processor core 514 may include an arithmetic logic unit (ALU), a floating point unit (FPU), a digital signal processing core (DSP core), or any combination thereof. An example memory controller 518 may also be used with the processor 504, or in some implementations, the memory controller 518 may be an internal part of the processor 504.

Depending on the desired configuration, the system memory 506 may be of any type, including but not limited to volatile memory (such as RAM), non-volatile memory (such as ROM, flash memory, etc.) or any combination thereof. The system memory 506 may include an operating system 520, an exosort application 522, and program data 524. The exosort application 522 may be configured to implement exosort as described herein. The program data 524 may include, among other data, collided elements 526, collision location data 528, and subarray data 529 or the like, as described herein.

The computing device 500 may have additional features or functionality, and additional interfaces to facilitate communications between the basic configuration 502 and any desired devices and interfaces. For example, a bus/interface controller 530 may be used to facilitate communications between the basic configuration 502 and one or more data storage devices 532 via a storage interface bus 534. The data storage devices 532 may be one or more removable storage devices 536, one or more non-removable storage devices 538, or a combination thereof. Examples of the removable storage and the non-removable storage devices include magnetic disk devices such as flexible disk drives and hard-disk drives (HDD), optical disk drives such as compact disc (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

The system memory 506, the removable storage devices 536, and the non-removable storage devices 538 are examples of computer storage media. Computer storage media includes, but is not limited to, RAM, ROM, EEPROM, flash memory or other memory technology, CD-ROM, digital versatile disks (DVDs), solid state drives (SSDs), or other optical storage, magnetic cassettes, magnetic tape, magnetic disk storage, or other magnetic storage devices, or any other medium which may be used to store the desired information and which may be accessed by the computing device 500. Any such computer storage media may be part of the computing device 500.

The computing device 500 may also include an interface bus 540 for facilitating communication from various interface devices (e.g., one or more output devices 542, one or more peripheral interfaces 550, and one or more communication devices 560) to the basic configuration 502 via the bus/interface controller 530. Some of the example output devices 542 include a graphics processing unit 544 and an audio processing unit 546, which may be configured to communicate to various external devices such as a display or speakers via one or more A/V ports 548. One or more example peripheral interfaces 550 may include a serial interface controller 554 or a parallel interface controller 556, which may be configured to communicate with external devices such as input devices (e.g., keyboard, mouse, pen, voice input device, touch input device, etc.) or other peripheral devices (e.g., printer, scanner, etc.) via one or more I/O ports 558. An example communication device 560 includes a network controller 562, which may be arranged to facilitate communications with one or more other computing devices 566 over a network communication link via one or more communication ports 564. The one or more other computing devices 566 may include servers at a datacenter, customer equipment, and comparable devices.

The network communication link may be one example of a communication media. Communication media may be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 500 may be implemented as a part of a general purpose or specialized server, mainframe, or similar computer that includes any of the above functions. The computing device 500 may also be implemented as a personal computer including both laptop computer and non-laptop computer configurations.

Figure 6:
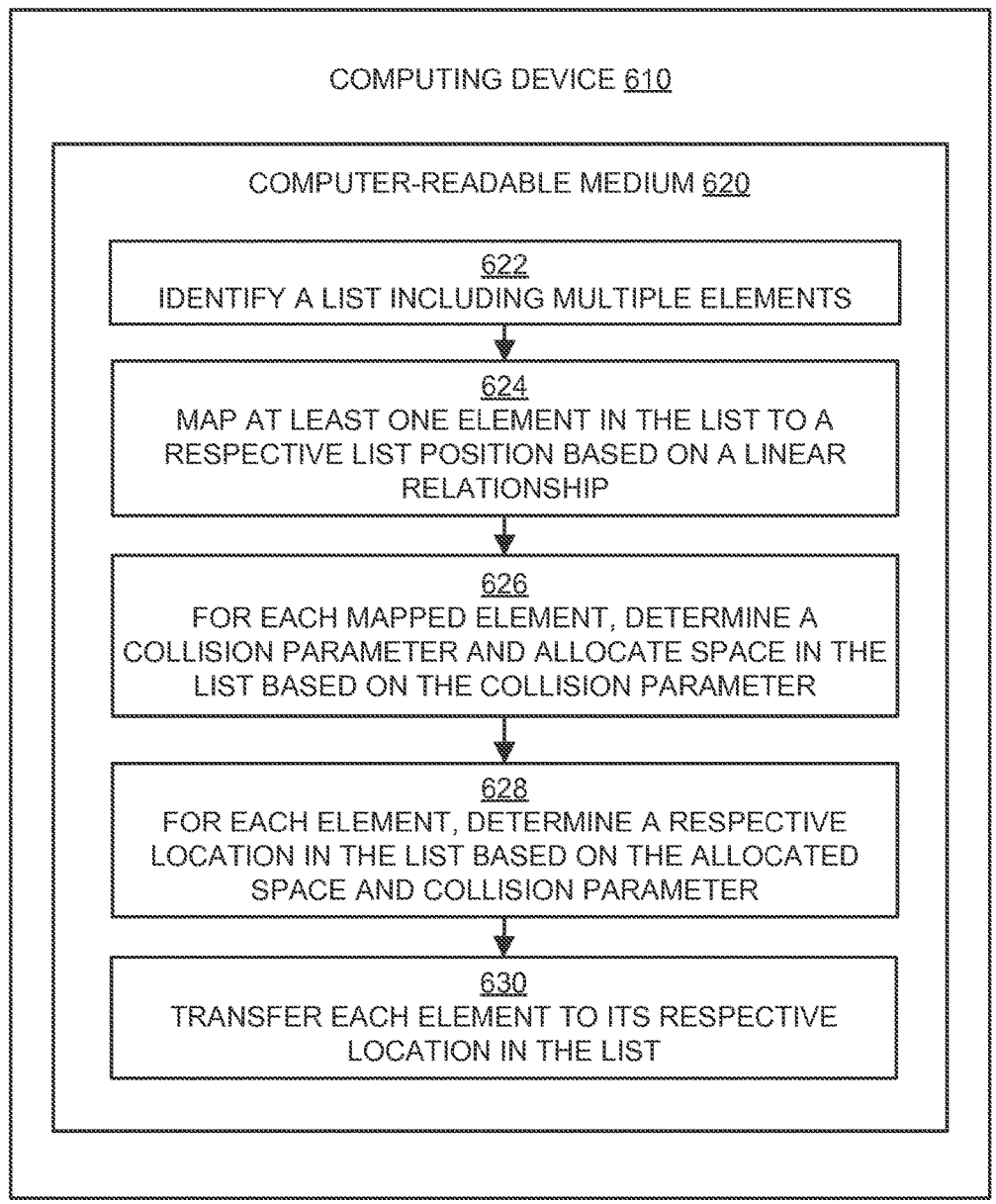
FIG. 6 is a flow diagram illustrating an example method for implementing exosort that may be performed by a computing device such as the computing device in FIG. 5.

FIG. 6 is a flow diagram illustrating an example method for implementing exosort that may be performed by a computing device such as the computing device in FIG. 5, arranged in accordance with at least some embodiments described herein.

Example methods may include one or more operations, functions or actions as illustrated by one or more of blocks 622, 624, 626, 628, and/or 630, and may in some embodiments be performed by a computing device such as the computing device 500 in FIG. 5. The operations described in the blocks 622-630 may also be stored as computer-executable instructions in a computer-readable medium such as a computer-readable medium 620 of a computing device 610.

An example process for implementing exosort may begin with block 622, "IDENTIFY A LIST INCLUDING MULTIPLE ELEMENTS", where a list to be sorted (for example, the list 102) may be identified. In some embodiments, the list to be sorted may be identified based on a subarray location and size, as described above.

Block 622 may be followed by block 624, "MAP AT LEAST ONE ELEMENT IN THE LIST TO A RESPECTIVE LIST POSITION BASED ON A LINEAR RELATIONSHIP", where one or more elements in the identified list may be mapped to positions in the list (or in an uncollided list like the uncollided list 110) according to a linear relationship as described above.

Block 624 may be followed by block 626, "FOR EACH MAPPED ELEMENT, DETERMINE A COLLISION PARAMETER AND ALLOCATE SPACE IN THE LIST BASED ON THE COLLISION PARAMETER", where elements in the identified list that collide with elements mapped in block 624 may be used to determine a respective collision parameter for each of the mapped elements. The collision parameter may include the identity of the colliding elements, the position (in the identified list or an uncollided list) where the collision occurred, and/or the number of collisions associated with the respective mapped element. The collision parameter may then be used to allocate space or positions in the identified list in the form of subarrays as described above.

Block 626 may be followed by block 628, "FOR EACH ELEMENT, DETERMINE A RESPECTIVE LOCATION IN THE LIST BASED ON THE ALLOCATED SPACE AND COLLISION PARAMETER", where positions for the mapped and collided elements may be determined in the identified list as described above. For example, each subarray determined in block 626 and its associated elements may be sorted using the exosort algorithm or another algorithm to determine appropriate positions in the identified list, as described above.

Block 628 may be followed by block 630, "TRANSFER EACH ELEMENT TO ITS RESPECTIVE LOCATION IN THE LIST", where mapped and/or collided elements may be transferred to their positions as determined in block 628, as described above.

FIG. 7 illustrates a block diagram of an example computer program product, arranged in accordance with at least some embodiments described herein.

In some examples, as shown in FIG. 7, a computer program product 700 may include a signal bearing medium 702 that may also include one or more machine readable instructions 704 that, when executed by, for example, a processor may provide the functionality described herein. Thus, for example, referring to the processor 504 in FIG. 5, the exosort application 522 may undertake one or more of the tasks shown in FIG. 7 in response to the instructions 704 conveyed to the processor 504 by the signal bearing medium 702 to perform actions associated with implementing exosort as described herein. Some of those instructions may include, for example, to identify a list including multiple elements, to map at least one element in the list to a respective list position based on a linear relationship, to determine a collision parameter and allocating space in the list based on the collision parameter for each mapped element, to determine a respective location in the list based on the allocated space and collision parameter for each element, and/or to transfer each element to its respective location in the list, according to some embodiments.

In some implementations, the signal bearing medium 702 depicted in FIG. 7 may encompass computer-readable medium 706, such as, but not limited to, a hard disk drive (HDD), a solid state drive (SSD), a Compact Disc (CD), a Digital Versatile Disk (DVD), a digital tape, memory, etc. In some implementations, the signal bearing medium 702 may encompass recordable medium 708, such as, but not limited to, memory, read/write (R/W) CDs, R/W DVDs, etc. In some implementations, the signal bearing medium 702 may encompass communications medium 710, such as, but not limited to, a digital and/or an analog communication medium (e.g., a fiber optic cable, a waveguide, a wired communication link, a wireless communication link, etc.). Thus, for example, the computer program product 700 may be conveyed to one or more modules of the processor 504 by an RF signal bearing medium, where the signal bearing medium 702 is conveyed by the wireless communications medium 710 (e.g., a wireless communications medium conforming with the IEEE 802.11 standard).

According to some examples, a method is provided to generate a sorted list in memory. The method may include identifying a list including multiple elements and stored at a first location in the memory, mapping at least one element to a respective list position, and determining a collision parameter for each mapped element. The method may further include allocating, for each mapped element, space in the memory based on the collision parameter, determining a respective memory location in the memory based on the allocated space and the collision parameter for each element in the multiple elements, and transferring each element to its respective memory location.

According to some embodiments, the method may further include determining for each mapped element, a colliding element selected from the multiple elements, combining each mapped element and its respective colliding element into a subarray, and storing the subarray in the space in the memory allocated for each respective mapped element by determining the respective memory location in the memory for each element. The method may further include combining each mapped element and its respective colliding element into the subarray using a sorting algorithm, where the sorting algorithm includes an exosort and/or a quicksort algorithm. The method may further include determining whether to use the exosort algorithm or the quicksort algorithm based on a number of elements in the subarray, and/or combining multiple mapped elements and their respective colliding elements into multiple respective subarrays substantially simultaneously.

According to other embodiments, the method may further include determining, for each mapped element, a colliding element selected from the multiple elements, storing the colliding element in a second list stored at a second location in the memory different from the first location, and determining the collision parameter based on the colliding element. The collision parameter may include a collision location for the colliding element and/or a collision count. The method may further include storing the collision count for each mapped element in a third list stored at a third location in the memory different from the first and second locations and/or storing the collision location in a fourth list stored at a fourth location in the memory different from the first, second, and third locations. The method may further include mapping the at least one element by storing each element in a respective memory location in a fifth list stored at a fifth location in the memory different from the first location. The at least one element may be mapped to the respective list based on a linear relationship computed based on a largest element in the list, a smallest element in the list, and/or a size of the list.

According to other examples, a computing device is provided to generate a sorted list. The computing device may include a memory and a processing block. The processing block may be configured to identify a list including multiple elements and stored at a first location in the memory, map at least one element to a respective list position based on a linear relationship, and determining a collision parameter for each mapped element. The processing block may be further configured to allocate, for each mapped element, space in the memory based on the collision parameter, determine a respective memory location in the memory based on the allocated space and the collision parameter for each element in the multiple elements, and transfer each element to its respective memory location.

According to some embodiments, the processing block may be further configured to determine for each mapped element, at least one colliding element selected from the multiple elements, combine each mapped element and its respective at least one colliding element into a respective subarray, and store the respective subarray in the space in the memory allocated for each respective mapped element by determining the respective memory location in the memory for each element. The processing block may be further configured to combine each mapped element and its respective at least one colliding element into the respective subarray using an exosort algorithm and/or a quicksort algorithm. The processing block may be further configured to determine whether to use the exosort algorithm or the quicksort algorithm based on a number of elements in the subarray, and/or combine multiple mapped elements and their respective at least one colliding elements into multiple respective subarrays substantially simultaneously.

According to other embodiments, the processing block may be further configured to determine, for each mapped element, at least one colliding element selected from the multiple elements, store the at least one colliding element in a second list stored at a second location in the memory different from the first location, and determine the collision parameter based on the at least one colliding element, where the collision parameter may include a collision location for the at least one colliding element and/or a collision count. The processing block may be further configured to store the collision count for each mapped element in a third list stored at a third location in the memory different from the first and second locations and/or store the collision location in a fourth list stored at a fourth location in the memory different from the first, second, and third locations. The processing block may be further configured to map the at least one element by storing each element in a respective memory location in a fifth list stored at a fifth location in the memory different from the first location and/or compute the linear relationship based on a largest element in the list, a smallest element in the list, and/or a size of the list.

According to further examples, a processor is provided to execute an application module to generate a sorted list. The processor may include an on-chip memory and one or more cores coupled to the on-chip memory and configured to execute the application module. The application module may be configured to identify a list including multiple elements and stored at a first location in the memory, map at least one element to a respective list position based on a linear relationship computed based on a largest element in the list, a smallest element in the list, and/or a size of the list, and determining a collision parameter for each mapped element. The application module may be further configured to allocate, for each mapped element, space in the memory based on the collision parameter, determine a respective memory location in the memory based on the allocated space and the collision parameter for each element in the multiple elements, and transfer each element to its respective memory location.

According to some embodiments, the application module may be further configured to determine for each mapped element at least one colliding element selected from the multiple elements, combine each mapped element and its respective at least one colliding element into a respective subarray, and store the respective subarray in the space in the memory allocated for each respective mapped element by determining the respective memory location in the memory for each element. The application module may be further configured to combine each mapped element and its respective at least one colliding element into the respective subarray using an exosort algorithm and/or a quicksort algorithm. The application module may be further configured to determine whether to use the exosort algorithm or the quicksort algorithm based on a number of elements in the subarray, and/or combine multiple mapped elements and their respective at least one colliding elements into multiple respective subarrays substantially simultaneously.

According to other embodiments, the application module may be further configured to determine for each mapped element at least one colliding element selected from the multiple elements, store the at least one colliding element in a second list stored at a second location in the memory different from the first location, and determine the collision parameter based on the at least one colliding element, where the collision parameter may include a collision location for the at least one colliding element and/or a collision count. The application module may be further configured to store the collision count for each mapped element in a third list stored at a third location in the memory different from the first and second locations and/or store the collision location in a fourth list stored at a fourth location in the memory different from the first, second, and third locations. The application module may be further configured to map the at least one element by storing each element in a respective memory location in a fifth list stored at a fifth location in the memory different from the first location.

According to yet further examples, a computer readable medium may store instructions for generating a sorted list in memory. The instructions may include identifying a list including multiple elements and stored at a first location in the memory, mapping at least one element to a respective list position, and determining a collision parameter for each mapped element. The instructions may further include allocating, for each mapped element, space in the memory based on the collision parameter, determining a respective memory location in the memory based on the allocated space and the collision parameter for each element in the multiple elements, and transferring each element to its respective memory location.

According to some embodiments, the instructions may further include determining for each mapped element, a colliding element selected from the multiple elements, combining each mapped element and its respective colliding element into a subarray, and storing the subarray in the space in the memory allocated for each respective mapped element by determining the respective memory location in the memory for each element. The instructions may further include combining each mapped element and its respective colliding element into the subarray using a sorting algorithm, where the sorting algorithm includes an exosort and/or a quicksort algorithm. The instructions may further include determining whether to use the exosort algorithm or the quicksort algorithm based on a number of elements in the subarray, and/or combining multiple mapped elements and their respective colliding elements into multiple respective subarrays substantially simultaneously.

According to other embodiments, the instructions may further include determining, for each mapped element, a colliding element selected from the multiple elements, storing the colliding element in a second list stored at a second location in the memory different from the first location, and determining the collision parameter based on the colliding element. The collision parameter may include a collision location for the colliding element and/or a collision count. The instructions may further include storing the collision count for each mapped element in a third list stored at a third location in the memory different from the first and second locations and/or storing the collision location in a fourth list stored at a fourth location in the memory different from the first, second, and third locations. The instructions may further include mapping the at least one element by storing each element in a respective memory location in a fifth list stored at a fifth location in the memory different from the first location. The at least one element may be mapped to the respective list based on a linear relationship computed based on a largest element in the list, a smallest element in the list, and/or a size of the list.

There is little distinction left between hardware and software implementations of aspects of systems; the use of hardware or software is generally (but not always, in that in certain contexts the choice between hardware and software may become significant) a design choice representing cost vs. efficiency tradeoffs. There are various vehicles by which processes and/or systems and/or other technologies described herein may be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, may be equivalently implemented in integrated circuits, as one or more computer programs executing on one or more computers (e.g., as one or more programs executing on one or more computer systems), as one or more programs executing on one or more processors (e.g., as one or more programs executing on one or more microprocessors), as firmware, or as virtually any combination thereof, and that designing the circuitry and/or writing the code for the software and/or firmware would be well within the skill of one of skill in the art in light of this disclosure.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is also to be understood that the terminology used herein is for the purpose of describing particular embodiments only, and is not intended to be limiting.

In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive (HDD), a Compact Disc (CD), a Digital Versatile Disk (DVD), a digital tape, a computer memory, a solid state drive (SSD), etc., and a transmission type medium such as a digital and/or an analog communication medium (e.g., a fiber optic cable, a waveguide, a wired communication link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a data processing system may include one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity of gantry systems; control motors to move and/or adjust components and/or quantities).

A data processing system may be implemented utilizing any suitable commercially available components, such as those found in data computing/communication and/or network computing/communication systems. The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable", to each other to achieve the desired functionality. Specific examples of operably couplable include but are not limited to physically connectable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general, such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method performed by a processor to increase a speed of sorting a plurality of elements stored in a memory, the method comprising:

identifying a list that includes the plurality of elements and that is stored at a first location in the memory;
   mapping at least one element in the plurality of elements to a respective list position;
   storing the mapped at least one element at another location, different from the first location, in the memory;
   determining, for the mapped at least one element, a respective collidine element selected from the plurality of elements, wherein the respective colliding element is stored at a second location in the memory;
   determining, for the mapped at least one element, a collision parameter, wherein the collision parameter includes at least one of a collision count for the mapped at least one element and a collision location for the respective colliding element, wherein the collision count is stored at a third location in the memory and the collision location is stored at a fourth location in the memory, and wherein the first location, the second location, the third location, the fourth location, and the another location are different from each other;
   allocating, for the mapped at least one element, a space in the memory based on the collision parameter;
   determining, for the mapped at least one element, a respective memory location in the memory based on the allocated space and the collision parameter,
   transferring the mapped at least one element to the respective memory location;
   combining the mapped at least one element and the respective colliding element into a subarray using a sorting algorithm;
   storing the subarray in the space in the memory allocated for the mapped at least one element by determining the respective memory location in the memory for the mapped at least one element;
   combining a plurality of mapped elements and respective colliding elements into a plurality of respective subarrays; and
   sorting the plurality of respective subarrays to generate a sorted list of the plurality of elements, wherein storing the mapped at least one element, the respective colliding element the collision count for the mapped at least one element, the collision location for the respective colliding element, and the subarray, at different locations in the memory, facilitates an increase in the speed of sorting to generate the sorted list of the plurality of elements.

2. The method of claim 1, wherein combining the mapped at least one element and the respective colliding element into the subarray using the sorting algorithm comprises combining the mapped at least one element and the respective colliding element into the subarray using at least one of an exosort algorithm and a quicksort algorithm.

3. The method of claim 2, further comprising determining whether to use at least one of the exosort algorithm and the quicksort algorithm based on a number of elements in the subarray.

4. The method of claim 1, wherein the list includes a first list,
   and wherein the respective colliding element is stored in a second list stored at the second location, different from the first location, in the memory.

5. The method of claim 1, wherein:
   the collision count for the mapped at least one element is stored in a third list stored at the third location, different from the first and second locations, in the memory, and
   the collision location for the respective colliding element is stored in a fourth list stored at the fourth location, different from the first, second, and third locations, in the memory.

6. The method of claim 1, wherein storing the mapped at least one element at the another location includes storing the mapped at least one element in a respective memory location in another list stored at the another location, different from the first location, in the memory.

7. The method of claim 1, wherein mapping the at least one element in the plurality of elements to the respective list position comprises mapping the at least one element based on at least one of a largest element in the list, a smallest element in the list, and a size of the list.

8. A computing device configured to increase a speed of sorting a plurality of elements stored in a memory, the computing device comprising:
   a processor block coupled to the memory, the processor block configured to:

identify a list that includes the plurality of elements and that is stored at a first location in the memory;

map at least one element in the plurality of elements, to a respective list position by storage of the mapped at least one element at another location, different from the first location, in the memory;

determine, for the mapped at least one element, a respective at least one colliding element selected from the plurality of elements, wherein the respective at least one colliding element is stored at a second location in the memory;

determine, for the mapped at least one element, a collision parameter, wherein the collision parameter includes at least one of a collision count for the mapped at least one element and a collision location for the respective at least one colliding element, wherein the collision count indicates a number of elements mapped to the respective list position, wherein the collision count is stored at a third location in the memory and the collision location is stored at a fourth location in the memory, and wherein the first location, the second location, the third location, the fourth location, and the another location are different from each other;

allocate, for the mapped at least one element, space in the memory based on the collision parameter;

determine, for the mapped at least one element, a respective memory location in the memory based on the allocated space and the collision parameter;

transfer the mapped at least one element to the respective memory location;

combine the mapped at least one element and the respective at least one colliding element into a respective subarray by use of at least one of an exosort algorithm and a quicksort algorithm;

store the respective subarray in the space in the memory allocated for the mapped at least one element by determination of the respective memory location in the memory for the mapped at least one element;

combine a plurality of mapped elements and respective colliding elements into a plurality of respective subarrays; and sort the plurality of respective subarrays to generate a sorted list of the plurality of elements, wherein the storage of the mapped at least one element, the respective at least one colliding element, the collision count for the mapped at least one element, the collision location for the respective at least one colliding element, and the subarray, at different locations in the memory, facilitates an increase in the speed of sorting to generate the sorted list of the plurality of elements.

9. The computing device of claim 8, wherein the processor block is configured to determine whether to use at least one of the exosort algorithm and the quicksort algorithm based on a number of elements in the respective subarray.

10. The computing device of claim 8, wherein the list includes a first list, and wherein the processor block is configured to:

store the respective at least one colliding element in a second list stored at the second location, different from the first location, in the memory.

11. The computing device of claim 10, wherein the processor block is configured to:

store the collision count for the mapped at least one element in a third list stored at the third location, different from the first and second locations, in the memory; and store the collision location for the respective at least one colliding element in a fourth list stored at the fourth location, different from the first, second, and third locations, in the memory.

12. The computing device of claim 8, wherein the processor block is configured to map the at least one element in the plurality of elements, to the respective list position, by storage of the mapped at least one element in a respective memory location in another list stored at the another location, different from the first location, in the memory.

13. The computing device of claim 8, wherein the processor block is configured to map the at least one element in the plurality of elements to the respective list position based on at least one of a largest element in the list, a smallest element in the list, and a size of the list.

14. A processor configured to execute an application module to increase a speed of sorting a plurality of elements stored in an on-chip memory, the processor comprising:

one or more cores operatively coupled to the on-chip memory, wherein at least one of the one or more cores is configured to execute the application module, and wherein the application module is configured to:

identify a list that includes the plurality of elements and that is stored at a first location in the on-chip memory;

map at least one element in the plurality of elements, to a respective list position by storage of the mapped at least one element at another location, different from the first location, in the on-chip memory, based on at least one of a largest element in the list, a smallest element in the list, and a size of the list;

determine, for the mapped at least one element, a respective at least one colliding element selected from the plurality of elements, wherein the respective at least one colliding element is stored at a second location in the on-chip memory;

determine, for the mapped at least one element, a collision parameter, wherein the collision parameter includes at least one of a collision count for the mapped at least one element and a collision location for the respective at least one collidine element, wherein the collision count is stored at a third location in the on-chip memory and the collision location is stored at a fourth location in the on-chip memory, and wherein the first location, the second location, the third location, the fourth location, and the another location are different from each other;

allocate, for the mapped at least one element, a space in the on-chip memory based on the collision parameter;

determine, for the mapped at least one element, a respective memory location in the on-chip memory based on the allocated space and the collision parameter, transfer the mapped at least one element to the respective memory location;

combine the mapped at least one element and the respective at least one colliding element into a respective subarray by use of at least one of an exosort algorithm and a quicksort algorithm;

store the respective subarray in the space in the memory allocated for the mapped at least one element by determination of the respective memory location in the on-chip memory for the mapped at least one element;

combine a plurality of mapped elements and respective colliding elements into a plurality of respective subarrays; and sort the plurality of respective subarrays to generate a sorted list of the plurality of elements, wherein the storage of the mapped at least one element, the respective at least one colliding element, the collision count for the mapped at least one element, the collision location for the respective at least one colliding element, and the subarray, at different locations in the on-chip memory, facilitates an increase in the speed of sorting to generate the sorted list of the plurality of elements.

15. The processor of claim 14, wherein the application module is configured to determine whether to use at least one of the exosort algorithm and the quicksort algorithm based on a number of elements in the respective subarray.

16. The processor of claim 14, wherein the list includes a first list, and wherein the application module is configured to:

store the respective at least one colliding element in a second list stored at the second location, different from the first location, in the on-chip memory.

17. The processor of claim 16, wherein the application module is configured to at least one of:

store the collision count for the mapped at least one element in a third list stored at the third location, different from the first and second locations, in the on-chip memory; and store the collision location for the respective at least one colliding element in a fourth list stored at the fourth location, different from the first, second, and third locations, in the on-chip memory.

18. The processor of claim 14, wherein the application module is configured to map the at least one element in the plurality of elements, to the respective list position, by storage of the mapped at least one element in a respective memory location in another list stored at the another location, different from the first location, in the on-chip memory.

* * * * *

UNITED STATES PATENT AND TRADEMARK OFFICE
CERTIFICATE OF CORRECTION

PATENT NO. : 9,858,179 B2
APPLICATION NO. : 14/430891
DATED : January 2, 2018
INVENTOR(S) : Chouery Page 1 of 1

It is certified that error appears in the above-identified patent and that said Letters Patent is hereby corrected as shown below:

In the Claims

In Column 17, Line 58, in Claim 1, delete "collidine" and insert -- colliding --, therefor.

In Column 18, Line 5, in Claim 1, delete "parameter," and insert -- parameter; --, therefor.

In Column 18, Line 8, in Claim 1, delete "parameter," and insert -- parameter; --, therefor.

In Column 18, Line 24, in Claim 1, delete "element the" and insert -- element, the --, therefor.

In Column 19, Line 4, in Claim 8, delete "position by" and insert -- position, by --, therefor.

In Column 19, Line 26, in Claim 8, delete "element, space" and insert -- element, a space --, therefor.

In Column 20, Line 32, in Claim 14, delete "position by" and insert -- position, by --, therefor.

In Column 20, Line 46, in Claim 14, delete "collidine" and insert -- colliding --, therefor.

In Column 20, Lines 58-59, in Claim 14, delete "parameter," and insert -- parameter; --, therefor.

Signed and Sealed this
First Day of May, 2018

Andrei Iancu
*Director of the United States Patent and Trademark Office*